(12) United States Patent
Baek et al.

(10) Patent No.: US 11,810,397 B2
(45) Date of Patent: Nov. 7, 2023

(54) METHOD AND APPARATUS WITH FACIAL IMAGE GENERATING

(71) Applicant: SAMSUNG ELECTRONICS CO., LTD., Suwon-si (KR)

(72) Inventors: Jiwon Baek, Hwaseong-si (KR); Seong-Jin Park, Suwon-si (KR); Seungju Han, Seoul (KR); Insoo Kim, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 17/208,048

(22) Filed: Mar. 22, 2021

(65) Prior Publication Data

US 2022/0058377 A1    Feb. 24, 2022

(30) Foreign Application Priority Data

Aug. 18, 2020  (KR) .................. 10-2020-0103447
Nov. 26, 2020  (KR) .................. 10-2020-0161545

(51) Int. Cl.
*G06V 40/16*  (2022.01)
*G06T 7/73*   (2017.01)
(Continued)

(52) U.S. Cl.
CPC .......... *G06V 40/172* (2022.01); *G06F 18/214* (2023.01); *G06N 3/04* (2013.01);
(Continued)

(58) Field of Classification Search
CPC ........ G06K 9/6256; G06K 9/627; G06N 3/04; G06N 3/08; G06T 11/00;
(Continued)

(56) References Cited

U.S. PATENT DOCUMENTS 9,323,980 B2   4/2016  Sun et al.
10,037,457 B2  7/2018  Tang et al.
10,134,177 B2  11/2018 Feng et al.

FOREIGN PATENT DOCUMENTS

CN    110543846 A    12/2019
KR    10-1328052 B1  11/2013
(Continued)

OTHER PUBLICATIONS

Chai et al: "Cross-generating GAN for Facial Identity Preserving", IEEE, 2018 (Year: 2018).*

(Continued)

*Primary Examiner* — Ruiping Li
(74) *Attorney, Agent, or Firm* — NSIP Law

(57) ABSTRACT

A processor-implemented facial image generating method includes: determining a first feature vector associated with a pose and a second feature vector associated with an identity by encoding an input image including a face; determining a flipped first feature vector by flipping the first feature vector with respect to an axis in a corresponding space; determining an assistant feature vector based on the flipped first feature vector and rotation information corresponding to the input image; determining a final feature vector based on the first feature vector and the assistant feature vector; and generating an output image including a rotated face by decoding the final feature vector and the second feature vector based on the rotation information.

30 Claims, 14 Drawing Sheets

(51) Int. Cl.
　　　*G06V 10/75*　　(2022.01)
　　　*G06N 3/04*　　 (2023.01)
　　　*G06N 3/08*　　 (2023.01)
　　　*G06T 3/40*　　 (2006.01)
　　　*G06T 3/60*　　 (2006.01)
　　　*G06T 9/00*　　 (2006.01)
　　　*G06F 18/214*　(2023.01)

(52) U.S. Cl.
　　　CPC ............... *G06N 3/08* (2013.01); *G06T 3/40* (2013.01); *G06T 3/60* (2013.01); *G06T 7/73* (2017.01); *G06T 9/002* (2013.01); *G06V 10/751* (2022.01); *G06V 40/171* (2022.01); *G06T 2207/20081* (2013.01); *G06T 2207/20084* (2013.01); *G06T 2207/30201* (2013.01)

(58) Field of Classification Search
　　　CPC . G06T 2207/20081; G06T 2207/20084; G06T 2207/30201; G06T 3/40; G06T 3/60; G06T 7/73; G06T 9/002; G06V 10/454; G06V 10/751; G06V 10/764; G06V 10/774; G06V 40/168; G06V 40/171; G06V 40/172
　　　See application file for complete search history.

(56) References Cited

FOREIGN PATENT DOCUMENTS

KR　　10-1608253 B1　　4/2016
WO　　WO 2019/056000 A1　3/2019

OTHER PUBLICATIONS

Tian, Yu, et al. "Cr-gan: Learning Complete Representations for Multi-View Generation." arXiv preprint arXiv:1806.11191 (2018). (7 pages in English).

Hu, Yibo, et al. "Pose-guided photorealistic face rotation." Proceedings of the IEEE Conference on Computer Vision and Pattern Recognition. 2018. (9 pages in English).

Zhu, Zhen, et al. "Progressive Pose Attention Transfer for Person Image Generation." Proceedings of the IEEE/CVF Conference on Computer Vision and Pattern Recognition. 2019. (10 pages in English).

Huang, Rui, et al. "Beyond face rotation: Global and Local Perception GAN for Photorealistic and Identity Preserving Frontal View Synthesis." Proceedings of the IEEE international conference on computer vision. 2017. (10 pages in English).

Ding, Changxing, Chang Xu, and Dacheng Tao. "Multi-Task Pose-Invariant Face Recognition." IEEE Transactions on Image Processing 24.3 (2015): 980-993. (14 pages in English).

Tran, Luan, Xi Yin, and Xiaoming Liu. "Disentangled Representation Learning GAN for Pose-Invariant Face Recognition." Proceedings of the IEEE conference on computer vision and pattern recognition. 2017. (10 pages in English).

Chai, Weilong, et al. "Cross-generating GAN for Facial Identity Preserving" *IEEE International Conference on Automatic Face & Gesture Recognition Computer Society* XP33354690A 2018 (5 pages in English).

Deng, Yu, et al. "Disentangled and Controllable Face Image Generation via 3D Imitative-Contrastive Learning" arXiv:2004.11660v1 XP81652417A Apr. 24, 2020 (17 pages in English).

Extended European Search Report dated Nov. 26, 2021 in counterpart European Patent Application No. 21178039.0 (9 pages in English).

* cited by examiner

METHOD AND APPARATUS WITH FACIAL IMAGE GENERATING

CROSS-REFERENCE TO RELATED APPLICATIONS

This application claims the benefit under 35 USC § 119(a) of Korean Patent Application No. 10-2020-0103447 filed on Aug. 18, 2020, in the Korean Intellectual Property Office, the entire disclosure of which is incorporated herein by reference for all purposes, and claims the benefit under 35 USC § 119(a) of Korean Patent Application No. 10-2020-0161545 filed on Nov. 26, 2020, in the Korean Intellectual Property Office, the entire disclosure of which is incorporated herein by reference for all purposes.

BACKGROUND

1. Field

The following description relates to a method and apparatus with facial image generating.

2. Description of Related Art

Facial recognition is a technology in computer vision that models and helps understand an actual world. Massive datasets may be used for facial recognition to which deep learning is applied. A general facial recognition system to which deep learning is applied may include an encoder configured to extract a feature from an input image and a decoder configured to generate an output image from a feature vector. By the application of deep learning, accuracy in the facial recognition may be improved. However, a recognition rate of the facial recognition may still be low due to various factors including external environmental factors such as illumination and other factors associated with image composition such as a facial pose in an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented facial image generating method includes: determining a first feature vector associated with a pose and a second feature vector associated with an identity by encoding an input image including a face; determining a flipped first feature vector by flipping the first feature vector with respect to an axis in a corresponding space; determining an assistant feature vector based on the flipped first feature vector and rotation information corresponding to the input image; determining a final feature vector based on the first feature vector and the assistant feature vector; and generating an output image including a rotated face by decoding the final feature vector and the second feature vector based on the rotation information.

The determining of the assistant feature vector may include: determining the assistant feature vector by applying, to a convolutional neural network (CNN), the flipped first feature vector, position information of a main feature of the face in the input image corresponding to a size of the flipped first feature vector, and the rotation information corresponding to the size of the flipped first feature vector.

The determining of the first feature vector and the second feature vector may include: determining, from the input image, position information of a main feature of the face in the input image; and determining the first feature vector and the second feature vector by encoding the position information and the input image, and the determining of the assistant feature vector may include: transforming the position information by flipping the position information with respect to the axis in the corresponding space; and determining the assistant feature vector based on the flipped first feature vector, the rotation information corresponding to the input image, and the transformed position information.

The transforming of the position information may include: resizing the position information to a size corresponding to a size of the flipped first feature vector.

The position information may include a landmark heatmap corresponding to the face in the input image.

The position information may include, for each pixel in each of the input image, a value between 0 and 1 representing a probability of the main feature of the face in the input image.

The rotation information may include information indicating a rotation direction for generating the output image from the input image, and a size of the rotation information may correspond to a size of the flipped first feature vector.

The determining of the assistant feature vector based on the rotation information may include: transforming the rotation information to indicate an opposite rotation direction; and determining the assistant feature vector based on the transformed rotation information.

The rotation information further may include information indicating a rotation degree for generating the output image from the input image.

The rotation information may be determined by comparing position information of a main feature of the face in the input image and a preset facial pose of the output image.

The generating of the output image further may include: transferring the output image as an input image for a subsequent iteration; and performing the subsequent iteration including the determining of the first feature vector and the second feature vector, the determining of the flipped first feature vector, the determining of the assistant feature vector, the determining of the final feature vector, and the generating of the output image, based on a rotation degree included in the rotation information.

The encoding of the input image may include encoding the input image using an encoder, and a neural network of the encoder may include: an input layer corresponding to the input image; and an output layer corresponding to the first feature vector and the second feature vector.

The decoding of the final feature vector and the second feature vector may include decoding the final feature vector and the second feature vector based on the rotation information, using a decoder, and a neural network of the decoder may include: an input layer corresponding to the final feature vector, the second feature vector, and the rotation information; and an output layer corresponding to the output image.

The determining of the flipped first feature vector may include: determining a flipped input image by flipping the input image with respect to the axis in the corresponding space; and determining the flipped first feature vector associated with the pose by encoding the flipped input image.

The method may include: extracting a feature for facial recognition based on the output image; and recognizing the face based on the extracted feature.

The method may include: generating a plurality of output images corresponding to the input image by varying a rotation degree included in the rotation information; and recognizing the face based on the generated output images.

The method may include training a neural network of an encoder used for the encoding, a neural network of a decoder used for the decoding, and a neural network used for the determining of the assistant feature vector, based on the output image and a target image corresponding to the input image.

A non-transitory computer-readable storage medium may store instructions that, when executed by one or more processors, configure the one or more processors to perform the method.

In another general aspect, a processor-implemented facial image generating method includes: determining a first feature vector associated with a pose and a second feature vector associated with an identity by applying, to an encoder, an input image including a face; determining a flipped first feature vector by flipping the first feature vector with respect to an axis in a corresponding space; determining an assistant feature vector by applying, to a first neural network, the flipped first feature vector and rotation information corresponding to the input image; determining a final feature vector based on the first feature vector and the assistant feature vector; generating an output image including a rotated face by applying, to a decoder, the final feature vector, the second feature vector, and the rotation information; and training a neural network of the encoder, a neural network of the decoder, and the first neural network, based on the output image and a target image corresponding to the input image.

The training may include: training based on a loss including any one or any combination of: a loss generated by comparing a feature extracted from the output image and a feature extracted from the target image; a loss generated by comparing pixelwise the output image and the target image; a loss generated by comparing an identity of the output image and an identity of the target image; a loss based on a difference in pixel value between pixels of the output image; and a generative adversarial network (GAN) loss based on the output image and the target image.

In another general aspect, a facial image generating apparatus includes: one or more processors configured to: determine a first feature vector associated with a pose and a second feature vector associated with an identity by encoding an input image including a face; determine a flipped first feature vector by flipping the first feature vector with respect to an axis in a corresponding space; determine an assistant feature vector based on the flipped first feature vector and rotation information corresponding to the input image; determine a final feature vector based on the first feature vector and the assistant feature vector; and generate an output image including a rotated face by decoding the final feature vector and the second feature vector based on the rotation information.

For the determining of the assistant feature vector, the one or more processors may be configured to: determine the assistant feature vector by applying, to a convolutional neural network (CNN), the flipped first feature vector, position information of a main feature of the face in the input image corresponding to a size of the flipped first feature vector, and the rotation information corresponding to the size of the flipped first feature vector.

The one or more processors may be configured to: for the determining of the first feature vector and the second feature vector, determine, from the input image, position information of a main feature of the face in the input image and determine the first feature vector and the second feature vector by encoding the position information and the input image; and for the determining of the assistant feature vector, transform position information by flipping the position information with respect to the axis in the corresponding space and resizing the position information to a size corresponding to a size of the flipped first feature vector, and determine the assistant feature vector based on the flipped first feature vector, the rotation information corresponding to the input image, and the transformed position information.

The rotation information may include information indicating a rotation direction and a rotation degree for generating the output image from the input image, and a size of the rotation information may correspond to a size of the flipped first feature vector.

For the generating of the output image, the one or more processors may be configured to: transfer the output image as an input image for a subsequent iteration; and perform the subsequent iteration of determining the first feature vector and the second feature vector, determining the flipped first feature vector, determining the assistant feature vector, determining the final feature vector, and generating the output image, based on a rotating degree included in the rotation information.

For the encoding of the input image, the one or more processors may be configured to encode the input image using an encoder, and a neural network of the encoder may include: an input layer corresponding to the input image; and an output layer corresponding to the first feature vector and the second feature vector.

For the decoding of the final feature vector and the second feature vector, the one or more processors may be configured to decode the final feature vector and the second feature vector based on the rotation information, using a decoder, and a neural network of the decoder may include: an input layer corresponding to the final feature vector, the second feature vector, and the rotation information; and an output layer corresponding to the output image.

For the determining of the flipped first feature vector, the one or more processors may be configured to: determine a flipped input image by flipping the input image with respect to the axis in the corresponding space; and determine the flipped first feature vector associated with the pose by encoding the flipped input image.

The one or more processors may be configured to: extract a feature for facial recognition based on the output image; and recognize the face based on the extracted feature.

In another general aspect, a processor-implemented facial image generating method includes: determining a first feature vector associated with a pose based on an input image including a face; determining a flipped feature vector as a symmetric transformation of the first feature vector; determining an assistant feature vector based on the flipped feature vector and rotation information corresponding to the input image; determining a final feature vector based on the first feature vector and the assistant feature vector; and generating an output image including a rotated face based on the final feature vector and the rotation information.

Other features and aspects will be apparent from the following detailed description, the drawings, and the claims.

Figure 1:
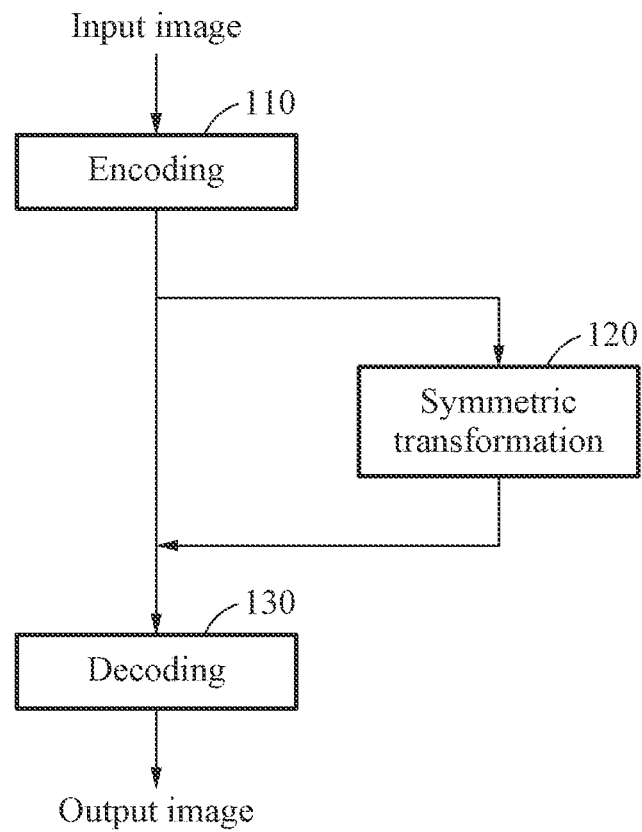
FIG. 1 illustrates an example of a facial image generating method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a facial image generating method.

Referring to FIG. 1, a facial image generating method may include operation 110 of encoding an input image, operation 120 of performing a symmetric transformation on a feature vector obtained through the encoding, and operation 130 of generating an output image by decoding the feature vector and a feature vector obtained through symmetric transformation. The facial image generating method of one or more embodiments may improve accuracy in facial recognition despite such adverse factors including external environmental factors such as illumination and other factors associated with image composition such as a facial pose in an image.

For example, operation 110 of the encoding may include obtaining a first feature vector associated with a pose and a second feature vector associated with an identity by encoding an input image including a face. Operation 110 may be performed by an encoding module (for example, an encoder) including a neural network. The encoding module may distinguishably output a pose-related feature vector and an identity-related feature vector by learning or training a pose-related feature and an identity-related feature from an input image in a disentangled manner. The pose-related feature vector may correspond to a feature vector dependent on a pose of a face (for example, an angle of the face and/or a direction of the face in the input image). The identity-related feature vector may correspond to a feature vector irrelevant to the pose of the face. Of an output of the encoding module, the pose-related feature vector is referred to herein as a first feature vector, and the identity-related feature vector irrelevant to a pose of a face is referred to herein as a second feature vector.

The encoding module may be a module configured to receive, as an input, the input image and position information of a main feature of the face in the input image, and output the first feature vector and the second feature vector. Hereinafter, the position information of a main feature of the face will also be referred to as position information of the input image. The position information of the input image may be information indicating a position of a main feature of the face used to verify a pose of the face in the input image. For example, referring to FIGS. 4 and 5, each of position information 402 of an input image 401 and position information 502 of an input image 501 may include a landmark heatmap that represents, as a value between 0 and 1, a probability of a main facial feature for each pixel in each of the input image 401 and the input image 501. Here, a main feature of a face or a main facial feature may include any facial feature such as any one of eyes, nose, and lips, as non-limiting examples.

Before operation 110, the facial image generating method may include obtaining the position information of the input image from the input image. The position information of the input image may be input to the encoding module along with the input image, and the first feature vector and the second feature vector may then be output. The position information of the input image may be used to determine rotation information for generating the output image, and used to obtain an assistant feature vector. Non-limiting examples of the rotation information and the assistant feature vector will be described in detail hereinafter.

Operation 120 of the symmetric transformation may include obtaining a flipped first feature vector by flipping the first feature vector with respect to an axis in a corresponding space, obtaining the assistant feature vector based on the flipped first feature vector and the rotation information corresponding to the input image, and obtaining a final feature vector based on the first feature vector and the assistant feature vector. Operation 120 may be performed by a symmetric transformation module. Non-limiting examples of the symmetric transformation module will be described in detail hereinafter.

Operation 130 of the decoding may include generating the output image including a rotated face by decoding the final feature vector obtained in operation 120 and the second feature vector obtained in operation 110 based on the rotation information corresponding to the input image. Operation 130 may be performing by a decoding module (for example, a decoder) including a neural network. The decoding module may generate an output image in which a face in an input image is rotated based on a preset facial pose in the output image. The preset facial pose may include a frontal face, a profile face, and the like. For example, the preset facial pose may include a pose rotated leftwards or rightwards by a preset angle from a frontal face. The rotation information corresponding to the input image may be determined based on position information of the face in the input image depending on the preset facial pose. That is, the rotation information may be determined by comparing the position information of the input image and the preset facial pose. The rotation information may include information as to whether to generate the output image corresponding to the preset facial pose based on a direction in which the face in the input image is rotated and a degree by which the face in the input image is rotated. That is, the rotation information may include information indicating a rotation direction and information indicating a rotation degree to generate the output image from the input image.

The decoding module may generate the output image in which the face in the input image is rotated by a preset rotation angle. Thus, the decoding module may generate the output image in which the face in the input image is rotated based on the information indicating the rotation degree. For example, to generate the output image in which the face in the input image is rotated by a preset rotation angle, the decoding module may generate the output image in which the face in the input image is rotated to correspond to the preset facial pose by repeating the facial image generating method based on the information indicating the rotation degree.

That is, in the facial image generating method, an operation of generating an output image may include transferring a generated output image as an input image for a subsequent iteration, and performing the iteration based on the rotation degree included in the rotation information. Here, an iteration refers to repeating the facial image generating method and includes obtaining a first feature vector and a second feature vector, obtaining a flipped first feature vector, obtaining an assistant feature vector, obtaining a final feature vector, and generating an output image.

Figure 2:
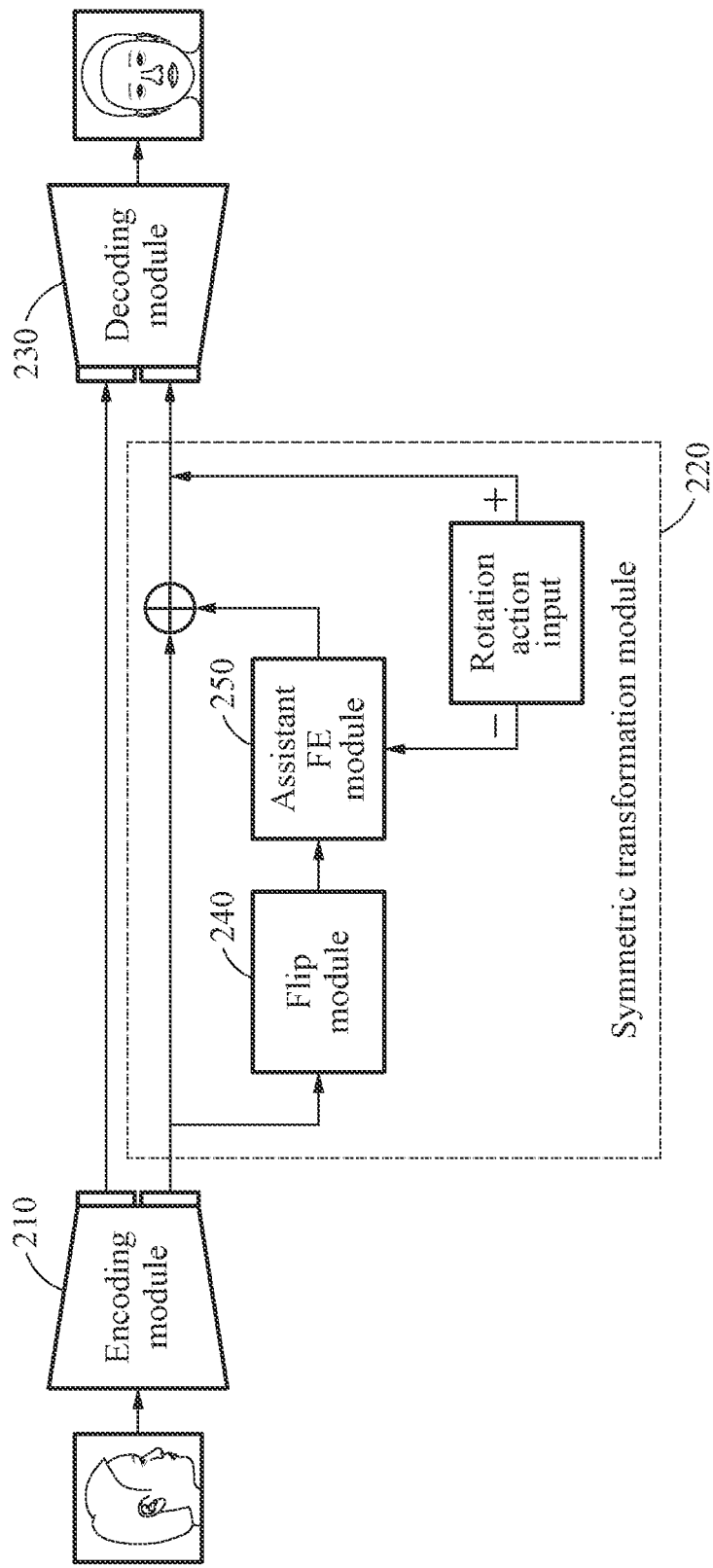
FIG. 2 illustrates an example of a facial image generation model.

FIG. 2 illustrates an example of a facial image generation model.

A facial image generation model may include one or more modules that perform a facial image generating method described herein and includes one or more processors and/or one or more memories. For the convenience of description, the facial image generation model will be described hereinafter distinguishably by each module based on its function. However, the facial image generation model is not limited to such an illustrated structure. The facial image generation model may further include a memory. Hereinafter, the facial image generation model will also be simply referred to as a model.

Referring to FIG. 2, the model may include modules that perform respective operations of the facial image generating methods described herein. For example, the model may include an encoding module 210 configured to encode an input image and extract a feature vector, a decoding module 230 configured to decode the feature vector and generate an output image, and a symmetric transformation module 220 configured to transform the feature vector output from the encoding module 210 into a feature vector to be input to the decoding module 230.

As described above, the encoding module 210 may encode an input image including a face and output a pose-related first feature vector and an identity-related second feature vector. The encoding module 210 may receive, as an input, position information of the input image along with the input image to encode the input image.

As described above, the decoding module 230 may decode a final feature vector and the second feature vector based on rotation information corresponding to the input image, and generate an output image including a rotated face. For example, by the decoding, the decoding module 230 may generate the output image in which the face in the input image is rotated by a preset rotation angle, or generate the output image in which the face in the input image is rotated based on information indicating a rotating degree included in the rotation information.

Figure 3:
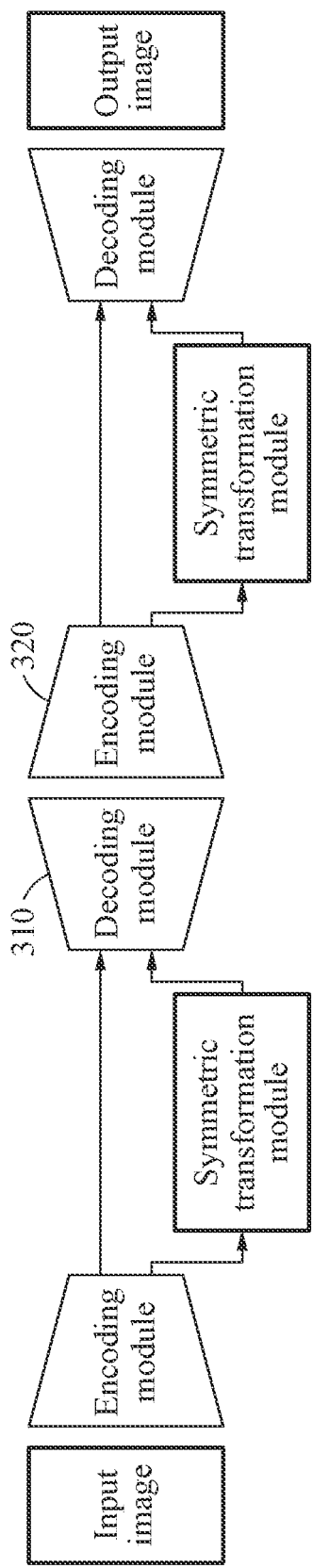
FIG. 3 illustrates an example of a model that repeatedly performs a facial image generating method.

In a case in which the decoding module 230 generates the output image in which the face in the input image is rotated by the preset rotation angle, the model may generate the output image in which the face in the input image is rotated to correspond to a preset facial pose, as illustrated in FIG. 3. FIG. 3 illustrates an example of a model that repeatedly performs a facial image generating method. Referring to FIG. 3, based on information indicating a rotation degree, a facial image generating method performed by a model may be repeated twice, and then an output image corresponding to a preset facial pose may be generated. In such a case, the facial image generating method may be repeatedly performed by the model using an output of a decoding module 310 as an input of an encoding module 320, and the output image may be generated. For example, in a case of generating an output image in which a face in an input image is rotated by 30 degrees)(° based on position information of the input image and preset facial pose information in the output image, the output image in which the face is rotated by 30° may be generated by performing the facial image generating method twice by the model to generate an image with the face rotated by 15° each time. In an example, information indicating a rotation direction may also be included in rotation information, and a decoding module may decode an output image based on the information indicating the rotation direction.

Although the model is illustrated in FIG. 3 as including a plurality of physically same modules, in another example, operations performed by the model may be repeated by inputting an output of a decoding module to an encoding module. For example, in an example of FIG. 2, the facial image generating method may be repeatedly performed by the model using an output of the decoding module 230 as a new input of the encoding module 210, and the output image may be generated.

Referring back to FIG. 2, the symmetric transformation module 220 may receive a pose-related first feature vector in an output of the encoding module 210, and output a final feature vector to be input to the decoding module 230. The symmetric transformation module 220 may generate a flipped first feature vector by flipping the input first feature vector with respect to an axis in a space corresponding to the first feature vector, generate an assistant feature vector based on the flipped first feature vector and rotation information, and generate a final feature vector based on the assistant feature vector and the first feature vector. The final feature vector may be obtained by calculating the assistant feature vector and the first feature vector. The calculating of the final feature vector may include adding the assistant feature vector and the first feature vector elementwise.

Figure 4:
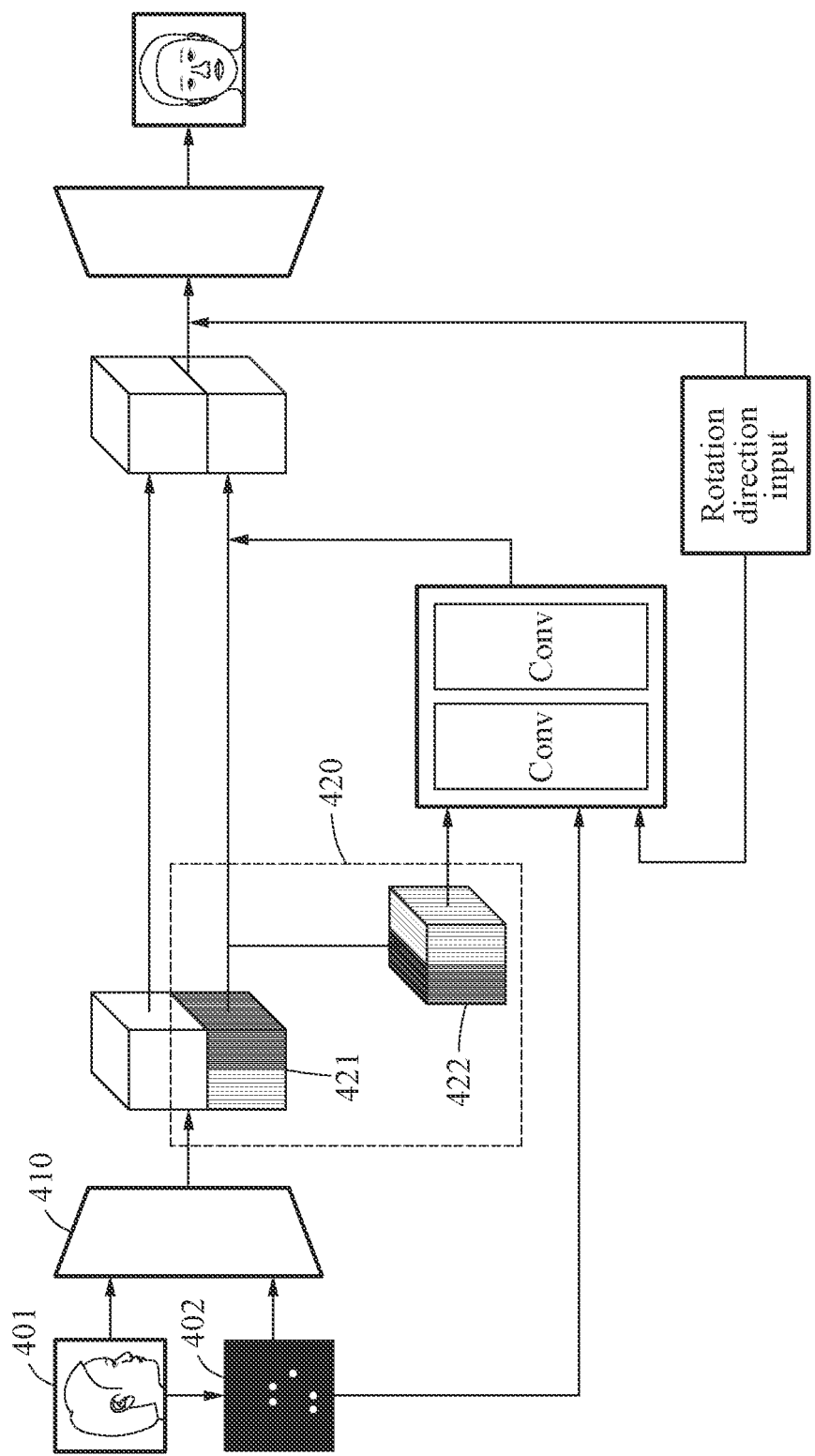
FIG. 4 illustrates an example of a flip module of a facial image generation model.

The symmetric transformation module 220 may include a flip module 240 configured to flip the input first feature vector with respect to the axis in the corresponding space to output the flipped first feature vector. A non-limiting example of the flip module 240 in the model may operate as illustrated in FIG. 4. FIG. 4 illustrates an example of a flip module of a facial image generation model. Referring to FIG. 4, a flip module 420 may receive, as an input, a first feature vector 421 in an output of an encoding module 410, and output a flipped first feature vector 422 by flipping the first feature vector 421. Non-limiting example of the flipping will be described in detail hereinafter with reference to FIGS. 6A and 6B.

Figure 5:
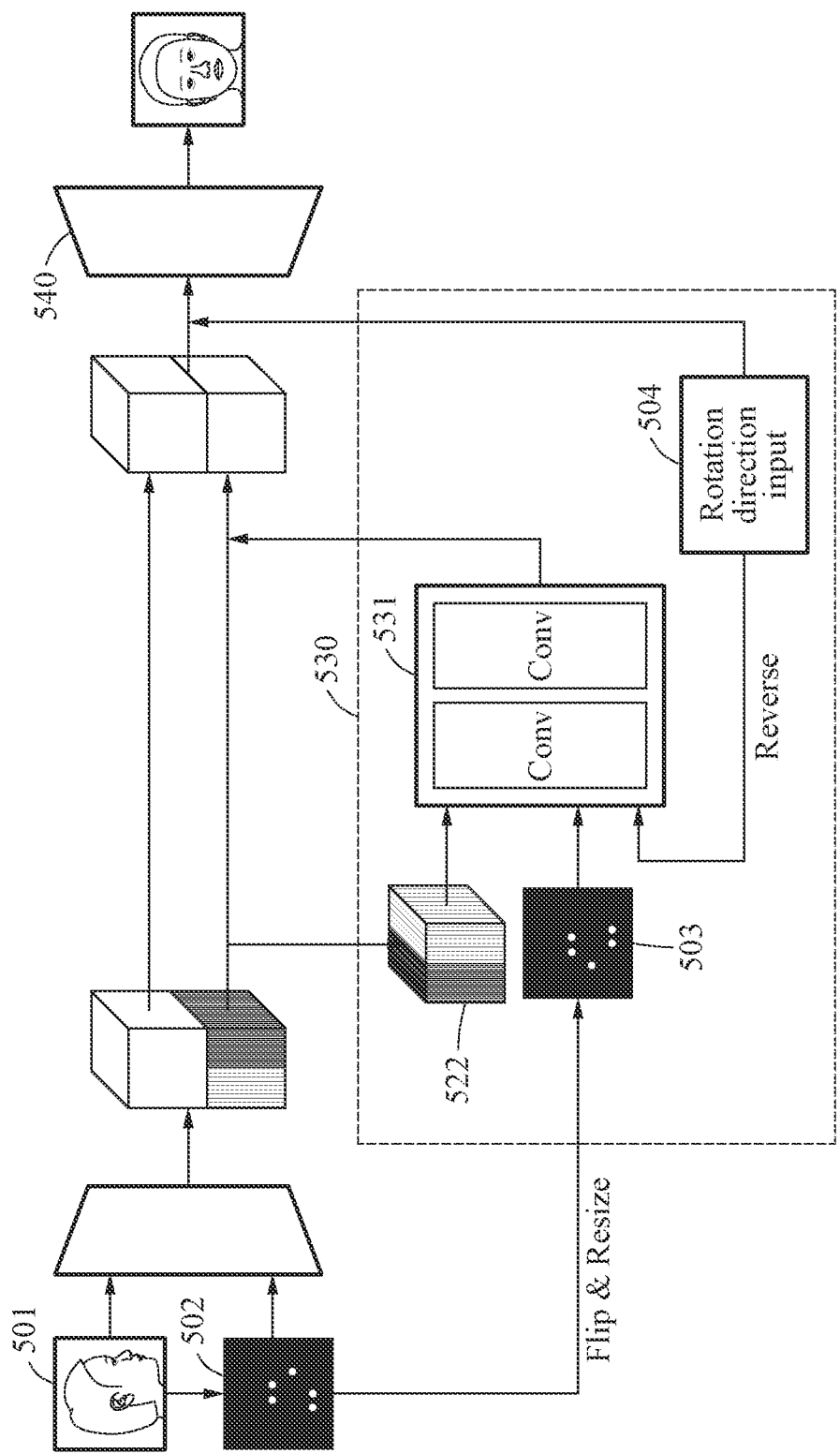
FIG. 5 illustrates an example of an assistant feature extraction module of a facial image generation model.

Referring back to FIG. 2, the symmetric transformation module 220 may include an assistant feature extraction (FE) module 250 configured to generate an assistant feature vector based on the flipped first feature vector and the rotation information. A non-limiting example of the assistant FE module 250 in the model may operate as illustrated in FIG. 5. FIG. 5 illustrates an example of an assistant feature extraction module of a facial image generation model. Referring to FIG. 5, an assistant FE module 530 may output an assistant feature vector by receiving, as an input, a flipped first feature vector 522, transformed position information 503 of an input image, and rotation information 504 and by applying the input to a neural network 531. A non-limiting example of a detailed structure of the assistant FE module 530 will be described hereinafter with reference to FIG. 7.

The transformed position information 503 may be information obtained by transforming position information obtained from the input image to be applied to the neural network 531. The transformed position information 503 may include information obtained by performing a transformation for flipping the position information obtained from the input image with respect to an axis in a corresponding space and/or a transformation for resizing the position information to a size corresponding to a size of the flipped first feature vector. That is, the transformed position information 503 may correspond to information in which the position information extracted from the input image is flipped or resized.

In addition, the rotation information 504 to be applied to the neural network 531 may include information indicating a rotation direction that is opposite to rotation information input to a decoding module 540. For example, in a case in which the rotation information 504 input to the decoding module 540 indicates that a face in the input image needs to be rotated leftwards to generate an output image, rotation information may be transformed to include information indicating a rightward rotation, and then the transformed rotation information may be input to the neural network 531 of the assistant FE module 530. That is, before the input to the neural network 531, the rotation information 504 may be transformed to have information indicating an opposite rotation direction by the processor of the model.

Figure 6A:
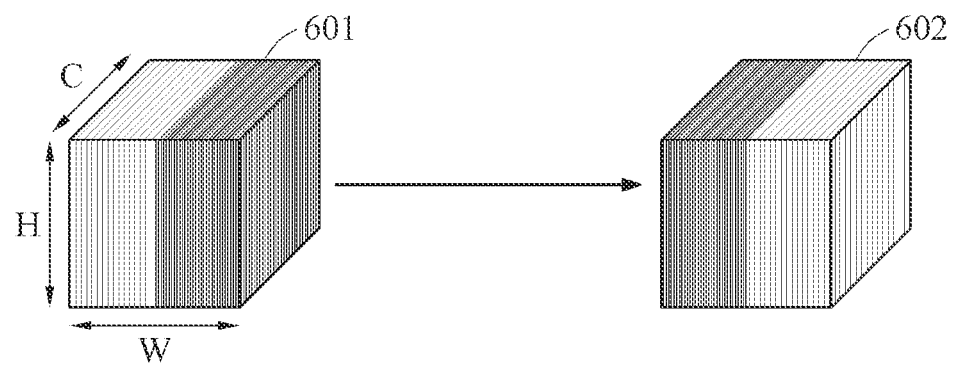
FIGS. 6A and 6B illustrate examples of a flipping operation of a flip module.
Figure 6B:
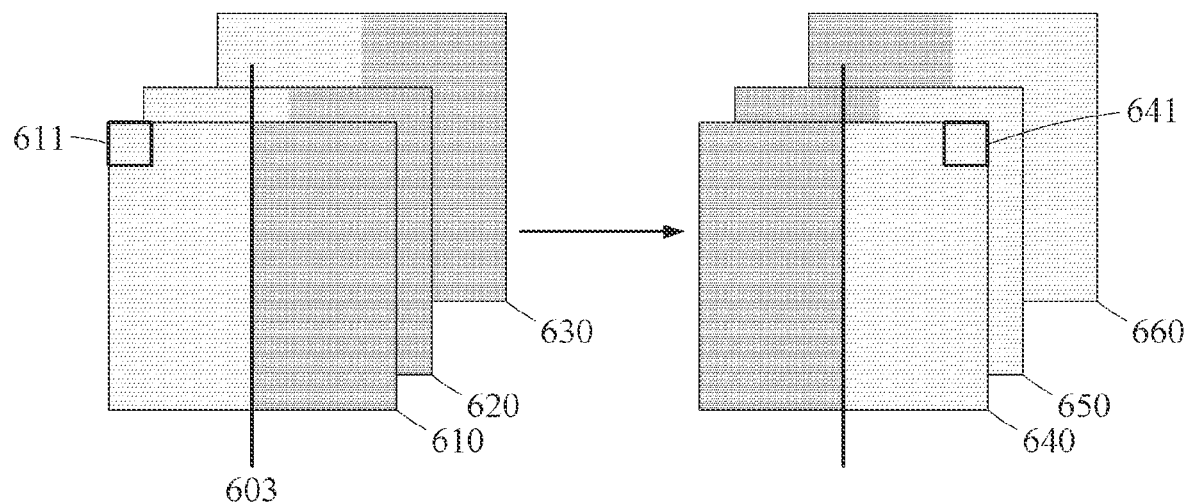

FIGS. 6A and 6B illustrate examples of a flipping operation of a flip module.

Referring to FIG. 6A, a first feature vector 601 may include a certain number of channels of a size. For example, the first feature vector 601 may include C channels of a size of W×H, which may be indicated by W×H×C. A flipped first feature vector 602, which is an output of a flip module, may include channels of the same size and number as the first feature vector 601, and may be obtained by flipping each of the channels of the first feature vector 601 with respect to a vertical axis in a corresponding space.

Referring to FIG. 6B, a first feature vector may include C channels 610, 620, and 630 having a size of W×H. A flipped first feature vector including C channels 640, 650, and 660 having the size of W×H may be obtained by flipping each channel of the first feature vector with respect to a certain axis in a space. For example, the channel 640 of the flipped first feature vector may be obtained by flipping the channel 610 of the first feature vector with respect to a height axis 603 that passes a center of a two-dimensional (2D) space. In this example, as a result of the flipping with respect to the axis 603, an element 611 in the channel 610 of the first feature vector may be moved to an element 641 in the channel 640 of the flipped first feature vector. For example, in a case in which each channel of the first feature vector corresponds to an image, each channel of the flipped first feature vector may correspond to an image in which each channel of the first feature vector is reversed left and right.

Figure 7:
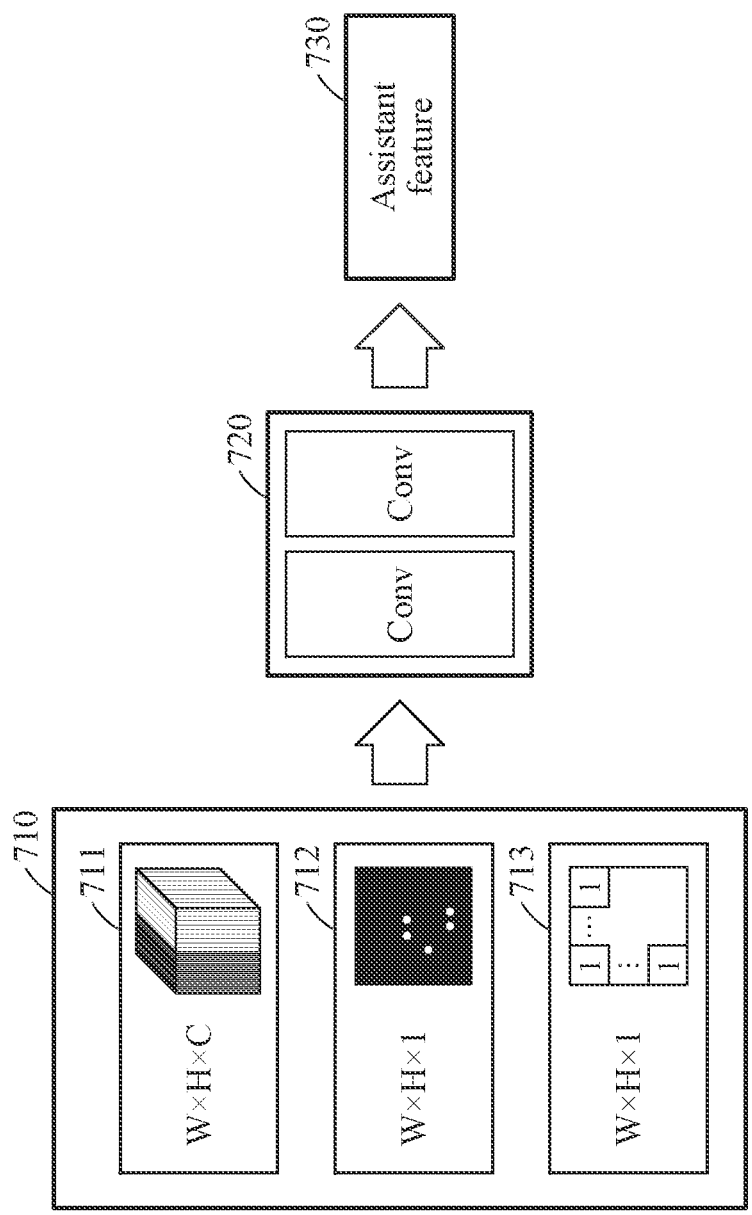
FIG. 7 illustrates an example of an assistant feature extraction module.

FIG. 7 illustrates an example of an assistant FE module. Referring to FIG. 7, an assistant FE module may include a neural network 720 configured to output an assistant feature vector, and may output output data 730 of an assistant feature from input data 710 including any one or any combination of a flipped first feature vector 711, position information 712 of an input image (for example, transformed position information), and rotation information 713 (for example, transformed rotation information). The neural network 720 of the assistant FE module may be a convolutional neural network (CNN). Although the neural network 720 is illustrated in FIG. 7 as being of a CNN architecture including a convolution layer, a structure of the neural network 720 of the assistant FE module is not limited to the illustrated example. For example, the neural network 720 configured to output an assistant feature vector may be embodied by various neural networks having various structures, for example, a CNN and a deep neural network (DNN).

In a case in which the neural network 720 is a CNN, each input channel may be embodied by a same dimension and a same size. For example, an input of the neural network 720 may include a flipped first feature vector 711 including C channels of a size of W×H, position information 712 of an input image of one channel of the size of W×H, and rotation information 713 of one channel of the size of W×H.

As described above, position information of an input image that is obtained from the input image may be transformed to be input to the neural network 720. That is, the position information of the input image to be input to the neural network 720 may correspond to position information that is transformed through operations performed by a processor of a model. Here, the transforming of the position information of the input image may include a symmetric transformation with respect to a certain axis in a space. In addition, the transforming of the position information may include resizing. For example, in a case in which a size of each channel of a first feature vector is W×H, the position information of the input image may be resized to have a size of W×H. That is, the position information 712 may correspond to information in which the position information of the input image is flipped and/or resized.

The rotation information 713 may be information having a size of W×H and including information indicating a rotation direction. The rotation information 713 may correspond to data in which a value of each element in a 2D matrix of a size of W×H is set to be a first value or a second value based on a rotation direction. For example, the first value may be 1 indicating that the rotation direction is left, and the second value may be −1 indicating that the rotation direction is right. In addition, the rotation information 713 may be set to be a value indicating a rotation direction and a rotation degree. For example, in a case in which the rotation direction is left and the rotation degree is 15°, the value of the rotation information 713 may be set to be 1. For example, in a case in which the rotation direction is left and the rotation degree is 30°, the value of the rotation information 713 may be set to be 2. For example, in a case in which the rotation direction is right and the rotation degree is 30°, the value of the rotation information 713 may be set to be −2.

As described above, the rotation information 713 to be input to the neural network 720 of the assistant FE module may include information indicating a direction that is opposite to a direction in which the input image needs to be rotated to have a preset facial pose. For example, in a case in which the input image needs to be rotated leftwards by 30° to have a preset facial pose, the rotation information 713 to be input to the neural network 720 of the assistant FE module may include information indicating a rightward rotation by 30°.

Figure 8:
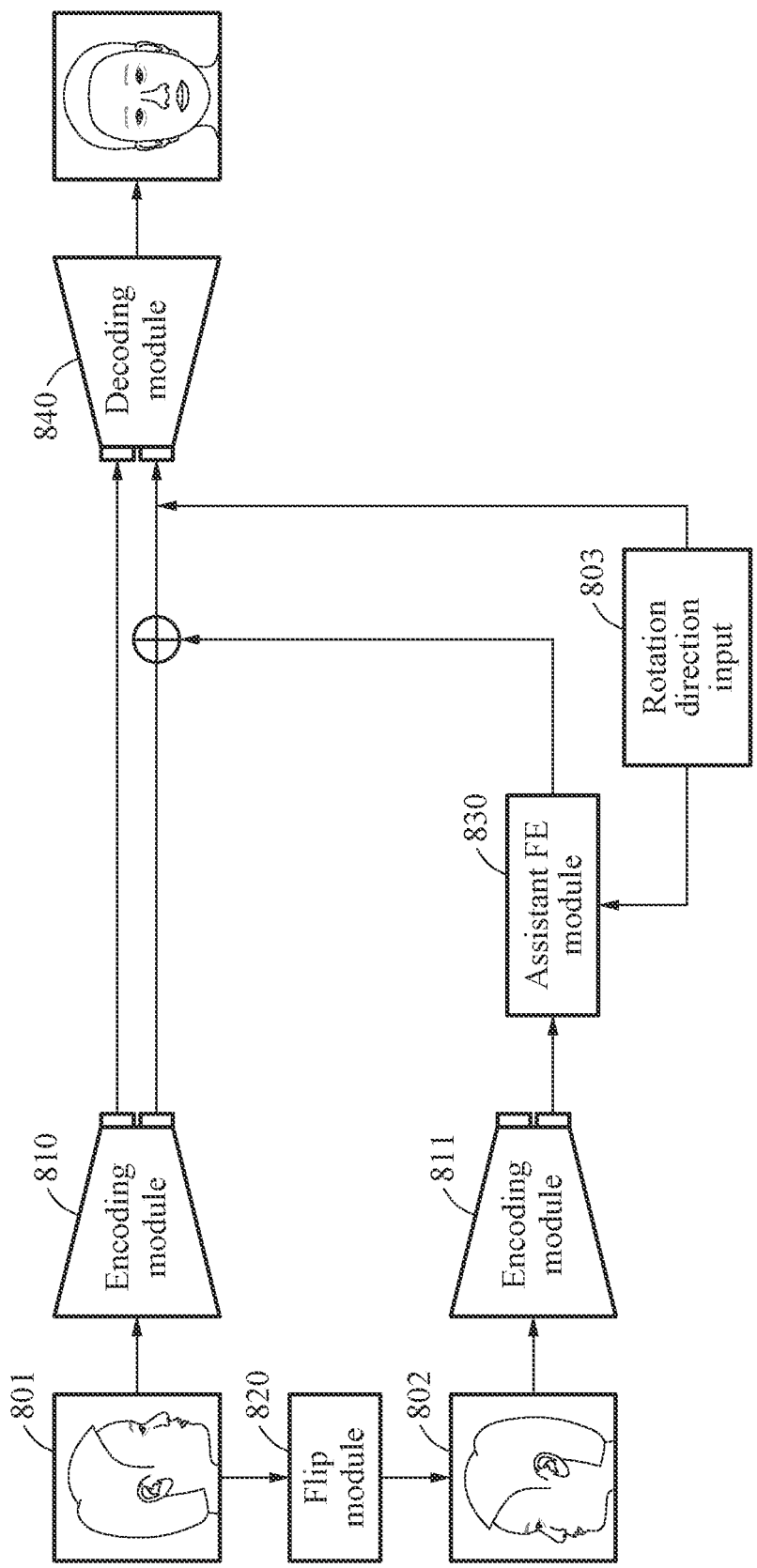
FIG. 8 illustrates an example of applying a symmetric transformation to an input image.

FIG. 8 illustrates an example of applying a symmetric transformation to an input image.

Referring to FIG. 8, a flip module 820 may flip an input image 801 with respect to an axis in a space to output a flipped input image 802. The input image 801 and the flipped input image 802 may be input to encoding modules 810 and 811, respectively, and first feature vectors associated with poses respectively corresponding to the input image 801 and the flipped input image 802 may be output. In an example, a first feature vector corresponding to the flipped input image 802 (for example, a flipped first feature vector) may be input to an assistant FE module 830, and an assistant feature vector may be output. The assistant FE module 830 may receive, as an input, rotation information 803 and/or position information of the flipped input image 802 along with the first feature vector corresponding to the flipped input image 802. Here, the position information of the flipped input image 802 may be resized to have a size corresponding to a size of the first feature vector of the flipped input image 802. That is, the position information of the flipped input image 802 may correspond to transformed position information obtained through flipping and resizing the position information of the input image 801. In an example, a final feature vector to be input to a decoding module 840 may be obtained based on the assistant feature vector output from the assistant FE module 830 and the first feature vector corresponding to the input image 801 output from the encoding module 810. The decoding module 840 may decode the final feature vector and a second feature vector irrelevant to the pose corresponding to the input image 801 based on the rotation information 803 to generate an output image.

That is, a facial image generating method of one or more embodiments described herein may include an operation of obtaining a pose-related first feature vector and an identity-related second feature vector irrelevant to a pose by encoding an input image including a face, an operation of obtaining a flipped input image by flipping the input image with respect to an axis in a corresponding space, an operation of obtaining a pose-related flipped first feature vector by encoding the flipped input image, an operation of obtaining an assistant feature vector based on the flipped first feature vector and rotation information corresponding to the input image, an operation of obtaining a final feature vector based on the first feature vector and the assistant feature vector, and an operation of generating an output image including a rotated face by decoding the final feature vector and the second feature vector based on the rotation information.

Figure 9:
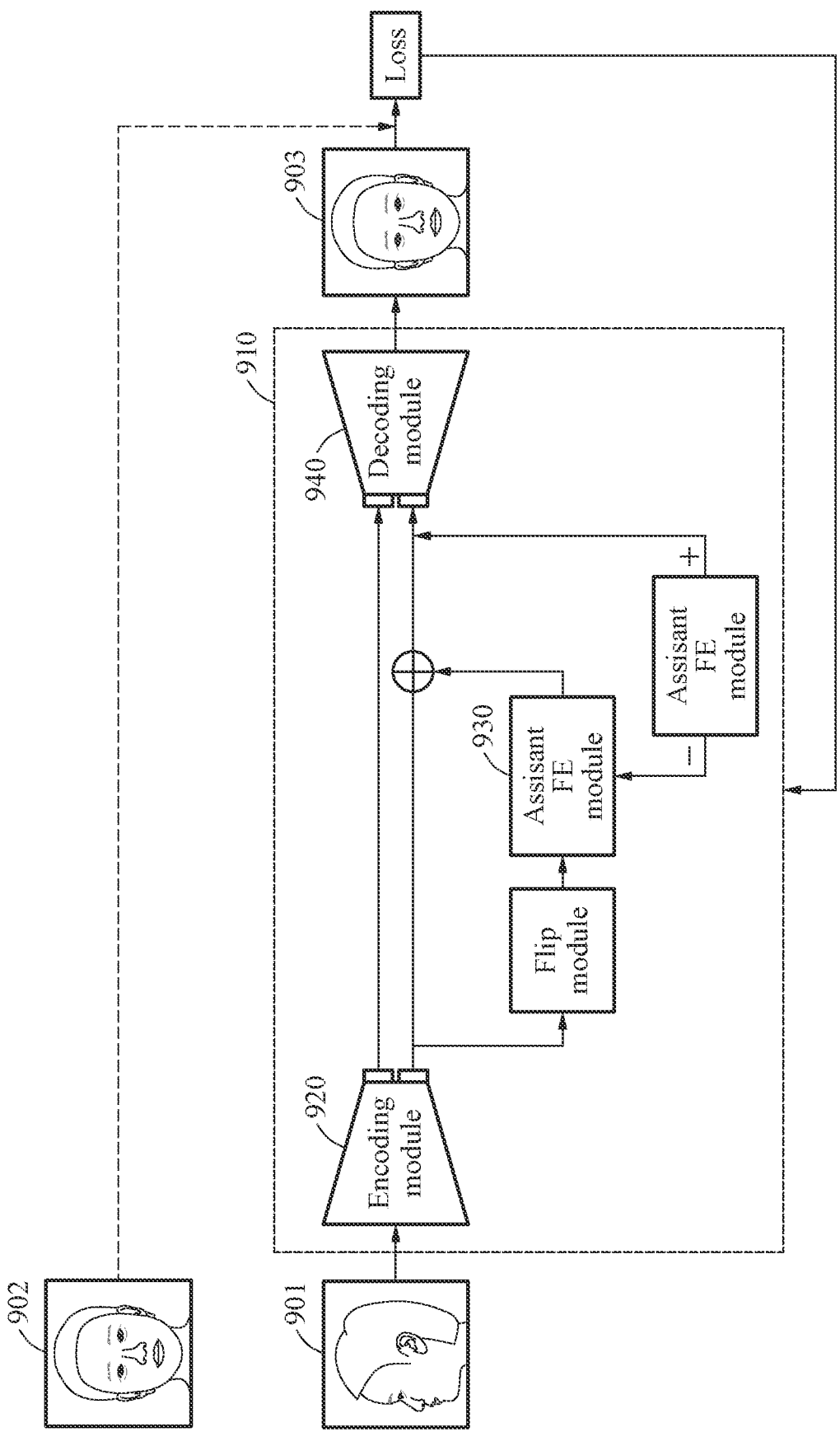
FIG. 9 illustrates an example of a training method of a facial image generation model.

FIG. 9 illustrates an example of a training method of a facial image generation model.

Referring to FIG. 9, a model 910 may be trained based on an input image 901 and a target image 902 corresponding to the input image 901. That is, a neural network in the model 910 may be trained to generate the output image 903 similar to the target image 902, and various training or learning algorithms may be used for the training. The neural network in the model 910 may include a neural network of encoding module 920 for extracting a first feature vector and a second feature vector from an input image, a neural network of a decoding module 940 for generating an output image, and a neural network of an assistant FE module 930. The training of the model 910 may be performed by a training module which include processor and/or memory.

In an example, a facial image generation model may be trained based on various loss functions. A loss function may be determined based on a single loss or a combination of a plurality of losses. The facial image generation model may be trained by optimizing a parameter of the neural network in the facial image generation model based on such a loss function.

Here, a loss for generating a loss function may include, for example, a perceptual loss between an output image and a target image, a pixelwise loss generated by comparing the output image and the target image pixelwise, an identity preserving loss generated by comparing an identity of the output image and an identity of the target image, a loss based on a difference in pixel value between pixels of the output image, a generative adversarial network (GAN) loss based on the output image and the target image, and the like.

The perceptual loss between the output image and the target image and the pixelwise loss generated by comparing the output image and the target image pixelwise may correspond to a loss determined by comparing the output image and the target image. The perceptual loss between the output image and the target image may be generated by comparing a feature extracted from the output image and a feature extracted from the target image. The pixelwise loss generated by comparing the output image and the target image pixelwise may correspond to a loss generated based on a difference between a pixel value of the output image and a pixel value of the target image corresponding to the pixel value of the output image. The facial image generation model may be trained to generate the output image similar to the target image by being trained using the loss determined by comparing the output image and the target image.

The loss based on the difference in pixel value between the pixels of the output image may correspond to a loss based on a difference between a pixel value of a pixel in the output image and a pixel value of a neighboring pixel adjacent to the pixel. The facial image generation model may be trained to generate the output image in which neighboring pixels are naturally connected by being trained using the loss determined based on pixel values of pixels in the output image.

Figure 10:
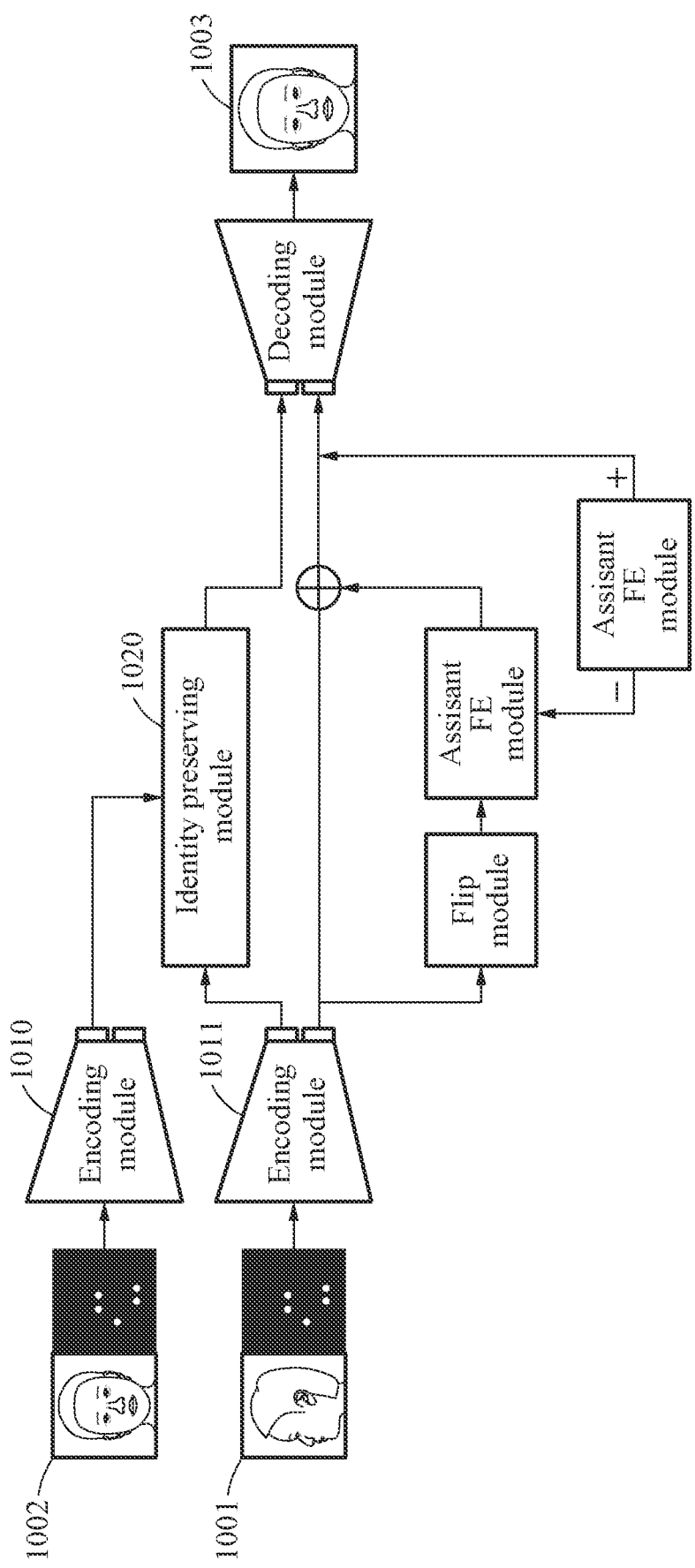
FIG. 10 illustrates an example of training a model using a loss generated by comparing an identity of an output image and an identity of a target image.

The identity preserving loss generated by comparing the identity of the output image and the identity of the target image may be determined based on an identity-related second feature vector obtained from an input image and a second feature vector obtained from the target image. The identity preserving loss may correspond to a loss for synthesizing or generating a face in the output image while preserving the same identity of a face in the input image. In an example, a module for training a model using a loss generated by comparing an identity of an output image and an identity of a target image will be described in detail hereinafter with reference to FIG. 10. FIG. 10 illustrates an example of training a model using a loss generated by comparing an identity of an output image and an identity of a target image. Referring to FIG. 10, an identity preserving module 1020 may perform training of a model based on a loss generated by comparing an identity of an output image 1003 and an identity of a target image 1002. The identity preserving module 1020 may train a neural network in the model based on a loss determined by comparing a second feature vector of the target image 1002 output from an encoding module 1010 and a second feature vector of an input image 1001 output from an encoding module 1011. That is, a neural network of a facial image training model is trained to generate, from the input image 1001, the output image 1003 that preserves the same identity of the input image 1001 or the target image 1002.

Figure 11:
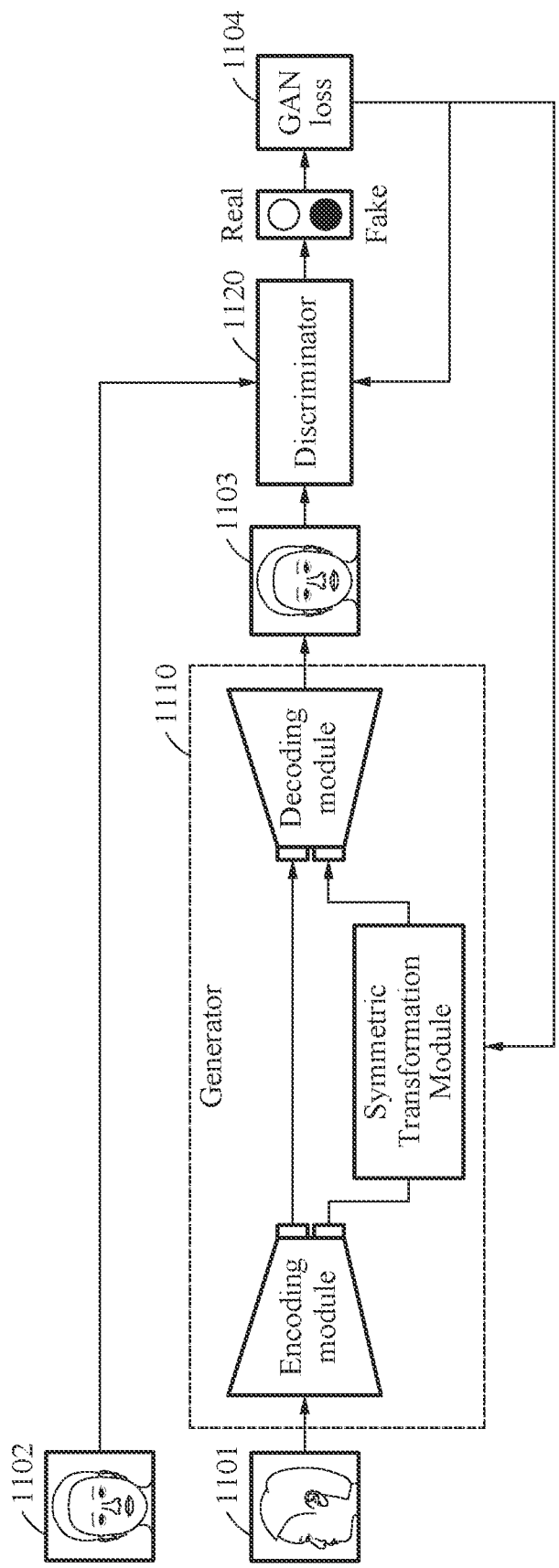
FIG. 11 illustrates an example of training a model using a generative adversarial network (GAN) loss based on an output image and a target image.

FIG. 11 illustrates an example of training a model using a GAN loss (for example, a GAN loss 1104) based on an output image and a target image. Referring to FIG. 11, a discriminator 1120 may be trained to determine the output image 1103 to be fake and the target image 1102 to be real, and a facial image generation model 1110, or hereinafter a generator 1110, may be trained to generate the output image 1103 determined to be real by the discriminator 1120, by using the GAN loss 1104. The generator 1110 may be trained to generate the output image 1103 that is similar to the target image 1102 by using the GAN loss 1104.

Figure 12A:
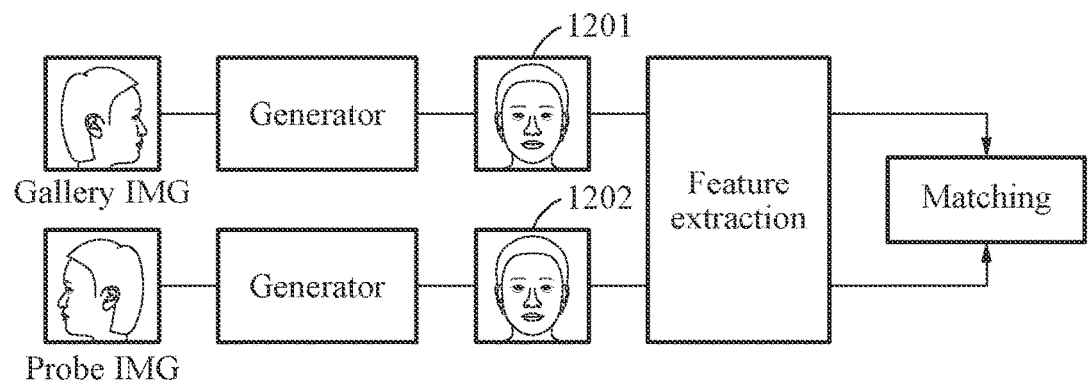
FIGS. 12A through 12C illustrate examples of using an image generation model.
Figure 12B:
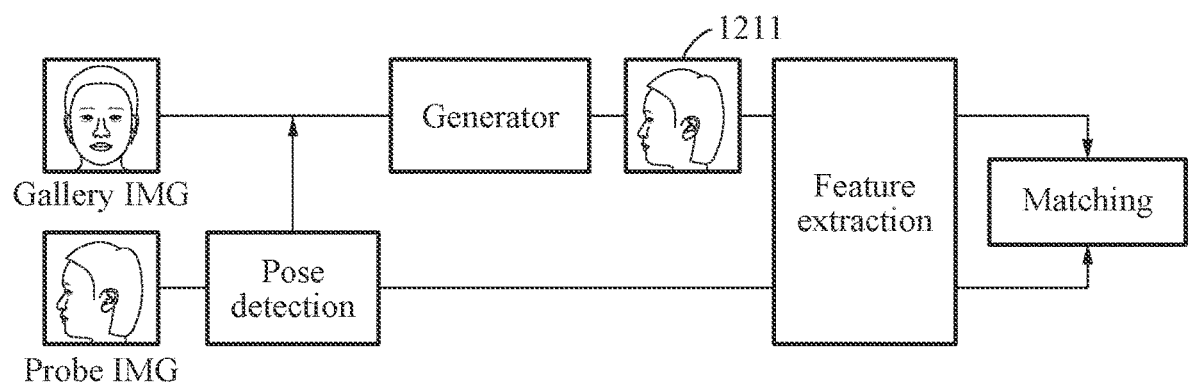
Figure 12C:
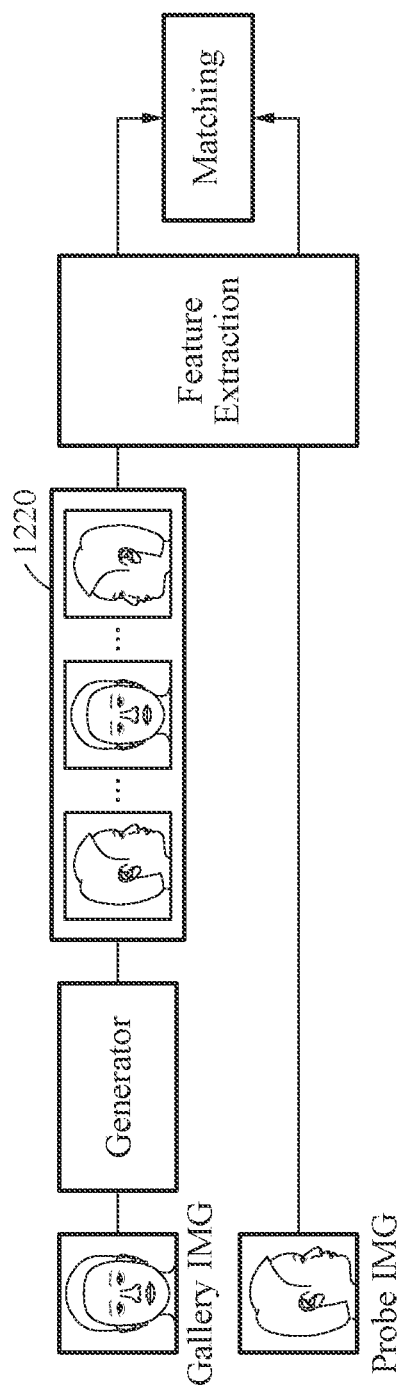

FIGS. 12A through 12C illustrate examples of using an image generation model (for example, a generator).

Referring to FIGS. 12A through 12C, a facial image generation model, or hereinafter a generator, may be used for user verification that matches a previously stored gallery image (Gallery IMG) of a user and a newly input probe image (Probe IMG).

FIG. 12A illustrates a process of inputting a previously stored image (Gallery IMG) and a target image (Probe IMG) to a generator, generating output images 1201 and 1202 including faces with a same facial pose respectively based thereon, and performing user verification based on the generated output images 1201 and 1202. Here, a facial pose to be included in an output image may be set in advance, and a model may obtain rotation information used for generate an output image based on the preset facial pose.

FIG. 12B illustrates a process of inputting a previously stored image (Gallery IMG) to a model, generating an output image 1211 including a face with a same facial pose as one in a target image (Probe IMG), and performing user verification based on the generated output image 1211 and the target image. Here, rotation information to be used for a model to generate an output image may be obtained by detecting information of the facial pose in the target image and comparing it with position information of the previously stored image. By detecting information of a facial pose in the previously stored image and inputting the target image to the model, an output image may be generated to include a face that is rotated such that a face in the target image has the same facial pose as the facial pose in the previously stored image.

FIG. 12C illustrates a process of inputting a previously stored image to a model (Gallery IMG), generating output images 1220 including faces with various facial poses, and performing user verification based on the generated output images 1220 and a target image (Probe IMG). Here, rotation information used in the model may be determined based on various preset facial poses. The user verification may be performed based on the generated output images 1220 and the target image. Referring to FIG. 12C, the user verification may be performed by selecting an output image corresponding to a facial pose similar to that in the target image from among the generated output images 1220.

In an example, images including faces with various facial poses that are output from an image generation model, or a generator, may be used as training data for a facial recognition model. For example, in a case in which the training data includes mainly an image including a frontal face, by using the generator, the training data may be increased by outputting images including faces with various angles while preserving an identity of a face from the image including the frontal face. By increasing the training data to have facial images including faces of various angles, performance of the facial recognition model may be improved such that the facial recognition model recognizes a face even when images including faces with various angles are input.

In addition, an assistant feature vector and/or a final feature vector of one or more embodiments may increase features observed in a feature space, thereby improving the accuracy of the facial recognition model. For example, the increased features may be used for a meta variance transfer (MVT) that transfers a variance observed in a certain class to another class.

In a case in which there are various angles of faces in the training data used for training the facial recognition model, or there is a great disparity between the angles of the faces in the training data, the generator of one or more embodiments may be applied to effectively train the facial recognition model. For example, for an image included in the training data, by determining a displacement vector associated with an angle of a face and fitting displacement vectors to a single trainable or learnable vector using the generator, the training of one or more embodiments may train the facial recognition model to minimize the disparity between the angles of the faces in the training data.

Figure 13:
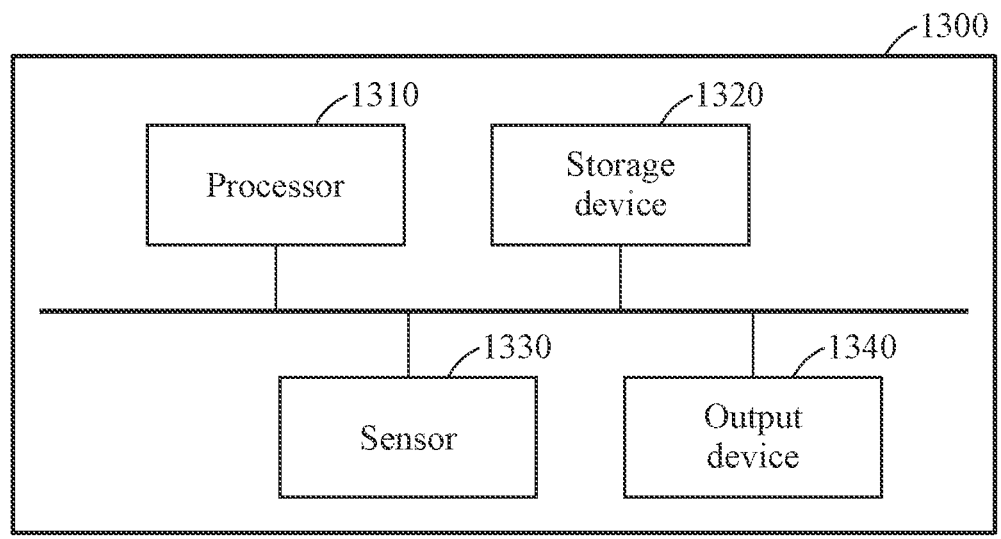
FIG. 13 illustrates an example of a facial image generating apparatus.

FIG. 13 illustrates an example of a facial image generating apparatus.

Any or all of the facial image generation models (or the generators) or the facial image generating methods described herein may be embodied by a facial image generating apparatus 1300. Any or all of the operations of the facial image generating methods may be performed by a processor 1310 of the apparatus. The facial image generating apparatus 1300 may include an output device 1340 configured to output an image including a face with a different facial pose from a facial pose in an input image, and the processor 1310 may be configured to perform user verification using the output image. The facial image generating apparatus 1300 may be or include a smartphone, a wearable device, a tablet computer, a net book, a laptop, a desktop, as non-limiting examples.

Referring to FIG. 13, the facial image generating apparatus 1300 may include a processor 1310 (for example, one or more processors), a storage device 1320 (for example, one or more memories), a sensor 1330, and an output device 1340. The processor 1310, the storage device 1320, the sensor 1330, and the output device 1340 may communicate with one another through a communication bus.

The sensor 1330 may include at least one sensor. The sensor 1330 may be or include an image sensor (for example, a camera). The sensor 1330 may capture an input image.

The processor 1310 may execute functions and instructions in the facial image generating apparatus 1300. For example, the processor 1310 may process instructions stored in the storage device 1320. The processor 1310 may perform one or more, or all, of the operations described above with reference to FIGS. 1 through 12C. The processor 1310 may include an encoding module configured to encode the input image captured by the sensor 1330 and extract a feature vector, a decoding module configured to decode the feature vector and generate an output image, and a symmetric transformation module configured to transform the feature vector output from the encoding module into a feature vector to be input to the decoding module. The processor 1310 may perform user verification using the output image. The processor 1310 may unlock a function of the facial image generating apparatus 1300 based on a result of the user verification.

The output device 1340 may provide an output of the facial image generating apparatus 1300 to a user through a visual, auditory, or tactile channel. The output device 1340 may include, for example, a liquid crystal display (LCD), a light-emitting diode (LED) display, a touchscreen, a speaker, a vibration generator, and other devices that may provide an output to a user. In an example, the output device 1340 may provide an unlocked screen as a result of the user verification. In an example, the output device 1340 may provide the output image.

The storage device 1320 may store information and data needed for the execution of the processor 1310. The storage 1320 may store instructions to be executed by the processor 1310. The storage device 1320 may include a computer-readable storage medium, for example, a random-access memory (RAM), a dynamic RAM (DRAM), a static RAM (SRAM), a magnetic hard disk, an optical disc, a flash memory, an erasable programmable read-only memory (EPROM), and other types of computer-readable storage medium that are known in the technical field to which the present disclosure pertains.

According to example embodiments described herein, the methods and apparatuses of one or more embodiments may generate a facial image that looks similar to an actual face by complementing insufficient information of a facial feature extracted from an input image, using facial symmetry.

The facial image generating apparatuses, encoding modules, symmetric transformation modules, decoding modules, flip modules, assistant FE modules, identity preserving modules, generators, discriminators, storage devices, sensors, output devices, encoding module 210, symmetric transformation module 220, decoding module 230, flip module 240, assistant FE module 250, decoding module 310, encoding module 320, encoding module 410, flip module 420, assistant FE module 530, decoding module 540, encoding module 810, encoding module 811, flip module 820, assistant FE module 830, decoding module 840, model 910, encoding module 920, assistant FE module 930, decoding module 940, encoding module 1010, encoding module 1011, identity preserving module 1020, generator 1110, discriminator 1120, facial image generating apparatus 1300, storage device 1320, sensor 1330, output device 1340, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented facial image generating method, comprising:
   determining a first feature vector associated with a pose and a second feature vector associated with an identity by encoding an input image including a face;
   determining a flipped first feature vector by swapping a value of a first element included in the first feature vector and a value of a second element located at a symmetrically transposed position with respect to an axis in the first feature vector, wherein the axis in the first feature vector corresponds to a center of columns of the first feature vector corresponding to a two-dimensional matrix;

determining an assistant feature vector based on the flipped first feature vector and rotation information corresponding to the input image;

determining a final feature vector based on the first feature vector and the assistant feature vector; and generating an output image including a rotated face by decoding the final feature vector and the second feature vector based on the rotation information.

2. The method of claim 1, wherein the determining of the assistant feature vector comprises:

determining the assistant feature vector by applying, to a convolutional neural network (CNN), the flipped first feature vector, position information of a main feature of the face in the input image corresponding to a size of the flipped first feature vector, and the rotation information corresponding to the size of the flipped first feature vector.

3. The method of claim 1, wherein the determining of the first feature vector and the second feature vector comprises:

determining, from the input image, position information of a main feature of the face in the input image; and determining the first feature vector and the second feature vector by encoding the position information and the input image, and the determining of the assistant feature vector comprises:

transforming the position information by flipping the position information with respect to the axis in the corresponding space; and determining the assistant feature vector based on the flipped first feature vector, the rotation information corresponding to the input image, and the transformed position information.

4. The method of claim 3, wherein the transforming of the position information comprises:

resizing the position information to a size corresponding to a size of the flipped first feature vector.

5. The method of claim 3, wherein the position information includes a landmark heatmap corresponding to the face in the input image.

6. The method of claim 3, wherein the position information includes, for each pixel in each of the input image, a value between 0 and 1 representing a probability of the main feature of the face in the input image.

7. The method of claim 1, wherein the rotation information includes information indicating a rotation direction for generating the output image from the input image, and a size of the rotation information corresponds to a size of the flipped first feature vector.

8. The method of claim 7, wherein the determining of the assistant feature vector based on the rotation information comprises:

transforming the rotation information to indicate an opposite rotation direction; and determining the assistant feature vector based on the transformed rotation information.

9. The method of claim 1, wherein the rotation information further includes information indicating a rotation degree for generating the output image from the input image.

10. The method of claim 9, wherein the rotation information is determined by comparing position information of a main feature of the face in the input image and a preset facial pose of the output image.

11. The method of claim 1, wherein the generating of the output image further comprises:

transferring the output image as an input image for a subsequent iteration; and performing the subsequent iteration including the determining of the first feature vector and the second feature vector, the determining of the flipped first feature vector, the determining of the assistant feature vector, the determining of the final feature vector, and the generating of the output image, based on a rotation degree included in the rotation information.

12. The method of claim 1, wherein the encoding of the input image comprises encoding the input image using an encoder, and a neural network of the encoder comprises:

an input layer corresponding to the input image; and an output layer corresponding to the first feature vector and the second feature vector.

13. The method of claim 1, wherein the decoding of the final feature vector and the second feature vector comprises decoding the final feature vector and the second feature vector based on the rotation information, using a decoder, and a neural network of the decoder comprises:

an input layer corresponding to the final feature vector, the second feature vector, and the rotation information; and an output layer corresponding to the output image.

14. The method of claim 1, wherein the determining of the flipped first feature vector comprises:

determining a flipped input image by flipping the input image with respect to the axis in the corresponding space; and determining the flipped first feature vector associated with the pose by encoding the flipped input image.

15. The method of claim 1, further comprising:

extracting a feature for facial recognition based on the output image; and recognizing the face based on the extracted feature.

16. The method of claim 1, further comprising:

generating a plurality of output images corresponding to the input image by varying a rotation degree included in the rotation information; and recognizing the face based on the generated output images.

17. The method of claim 1, further comprising training a neural network of an encoder used for the encoding, a neural network of a decoder used for the decoding, and a neural network used for the determining of the assistant feature vector, based on the output image and a target image corresponding to the input image.

18. A non-transitory computer-readable storage medium storing instructions that, when executed by one or more processors, configure the one or more processors to perform the method of claim 1.

19. A processor-implemented facial image generating method, comprising:

determining a first feature vector associated with a pose and a second feature vector associated with an identity by applying, to an encoder, an input image including a face;

determining a flipped first feature vector by flipping a value of a first element included in the first feature vector and a value of a second element located at a symmetrically transposed position with respect to an axis in the first feature vector, wherein the axis in the first feature vector corresponds to a center of columns of the first feature vector corresponding to a two-dimensional matrix;

determining an assistant feature vector by applying, to a first neural network, the flipped first feature vector and rotation information corresponding to the input image;

determining a final feature vector based on the first feature vector and the assistant feature vector;

generating an output image including a rotated face by applying, to a decoder, the final feature vector, the second feature vector, and the rotation information; and training a neural network of the encoder, a neural network of the decoder, and the first neural network, based on the output image and a target image corresponding to the input image.

20. The method of claim 19, wherein the training comprises:

training based on a loss including any one or any combination of:
  a loss generated by comparing a feature extracted from the output image and a feature extracted from the target image;
  a loss generated by comparing pixelwise the output image and the target image;
  a loss generated by comparing an identity of the output image and an identity of the target image;
  a loss based on a difference in pixel value between pixels of the output image; and
  a generative adversarial network (GAN) loss based on the output image and the target image.

21. A facial image generating apparatus, comprising:
one or more processors configured to:
  determine a first feature vector associated with a pose and a second feature vector associated with an identity by encoding an input image including a face;
  determine a flipped first feature vector by swapping a value of a first element included in the first feature vector and a value of a second element located at a symmetrically transposed position with respect to an axis in the first feature vector, wherein the axis in the first feature vector corresponds to a center of columns of the first feature vector corresponding to a two-dimensional matrix;
  determine an assistant feature vector based on the flipped first feature vector and rotation information corresponding to the input image;
  determine a final feature vector based on the first feature vector and the assistant feature vector; and
  generate an output image including a rotated face by decoding the final feature vector and the second feature vector based on the rotation information.

22. The apparatus of claim 21, wherein, for the determining of the assistant feature vector, the one or more processors are configured to:
  determine the assistant feature vector by applying, to a convolutional neural network (CNN), the flipped first feature vector, position information of a main feature of the face in the input image corresponding to a size of the flipped first feature vector, and the rotation information corresponding to the size of the flipped first feature vector.

23. The apparatus of claim 21, wherein the one or more processors are configured to:
  for the determining of the first feature vector and the second feature vector, determine, from the input image, position information of a main feature of the face in the input image and determine the first feature vector and the second feature vector by encoding the position information and the input image; and
  for the determining of the assistant feature vector, transform position information by flipping the position information with respect to the axis in the corresponding space and resizing the position information to a size corresponding to a size of the flipped first feature vector, and determine the assistant feature vector based on the flipped first feature vector, the rotation information corresponding to the input image, and the transformed position information.

24. The apparatus of claim 21, wherein
the rotation information includes information indicating a rotation direction and a rotation degree for generating the output image from the input image, and
a size of the rotation information corresponds to a size of the flipped first feature vector.

25. The apparatus of claim 21, wherein, for the generating of the output image, the one or more processors are configured to:
  transfer the output image as an input image for a subsequent iteration; and
  perform the subsequent iteration of determining the first feature vector and the second feature vector, determining the flipped first feature vector, determining the assistant feature vector, determining the final feature vector, and generating the output image, based on a rotating degree included in the rotation information.

26. The apparatus of claim 21, wherein
for the encoding of the input image, the one or more processors are configured to encode the input image using an encoder, and
a neural network of the encoder comprises:
  an input layer corresponding to the input image; and
  an output layer corresponding to the first feature vector and the second feature vector.

27. The apparatus of claim 21, wherein
for the decoding of the final feature vector and the second feature vector, the one or more processors are configured to decode the final feature vector and the second feature vector based on the rotation information, using a decoder, and
a neural network of the decoder comprises:
  an input layer corresponding to the final feature vector, the second feature vector, and the rotation information; and
  an output layer corresponding to the output image.

28. The apparatus of claim 21, wherein, for the determining of the flipped first feature vector, the one or more processors are configured to:
  determine a flipped input image by flipping the input image with respect to the axis in the corresponding space; and
  determine the flipped first feature vector associated with the pose by encoding the flipped input image.

29. The apparatus of claim 21, wherein the one or more processors are configured to:
  extract a feature for facial recognition based on the output image; and
  recognize the face based on the extracted feature.

30. A processor-implemented facial image generating method, comprising:
  determining a first feature vector associated with a pose based on an input image including a face;
  determining a flipped feature vector as a symmetric transformation of the first feature vector by swapping a value of a first element included in the first feature vector and a value of a second element located at a symmetrically transposed position with respect to an axis in the first feature vector, wherein the axis in the first feature vector corresponds to a center of columns of the first feature vector corresponding to a two-dimensional matrix;

determining an assistant feature vector based on the flipped feature vector and rotation information corresponding to the input image;

determining a final feature vector based on the first feature vector and the assistant feature vector; and generating an output image including a rotated face based on the final feature vector and the rotation information.

\* \* \* \* \*